US007016108B2

(12) United States Patent
Kolb et al.

(10) Patent No.: US 7,016,108 B2
(45) Date of Patent: Mar. 21, 2006

(54) MICROSCOPE

(75) Inventors: Hans-Joachim Kolb, Wetter (DE); Gerhard Pfeifer, Solms (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 10/479,350

(22) PCT Filed: May 14, 2002

(86) PCT No.: PCT/EP02/05273

§ 371 (c)(1),
(2), (4) Date: Jun. 10, 2004

(87) PCT Pub. No.: WO02/097509

PCT Pub. Date: Dec. 5, 2002

(65) Prior Publication Data

US 2004/0218264 A1    Nov. 4, 2004

(30) Foreign Application Priority Data

May 30, 2001 (DE) .............................. 101 26 291

(51) Int. Cl.
*G02B 21/00* (2006.01)
(52) U.S. Cl. ........................ 359/368; 359/391
(58) Field of Classification Search ............... 359/368, 359/385, 390, 391, 392; 348/79
See application file for complete search history.

(56) References Cited

U.S. PATENT DOCUMENTS 5,450,233 A    9/1995 Yamamoto et al.

| | | | |
|---|---|---|---|
| 6,236,503 B1 | 5/2001 | Kaczynski et al. | |
| 6,304,375 B1 * | 10/2001 | Furuhashi | 359/385 |
| 6,853,481 B1 * | 2/2005 | Sukekawa | 359/368 |
| 2003/0179445 A1 * | 9/2003 | Maenie et al. | 359/368 |

FOREIGN PATENT DOCUMENTS

| DE | 35 20475 | 10/1989 |
|---|---|---|
| DE | 40 10834 | 12/1990 |
| DE | 42 31 468 | 3/1994 |
| DE | 196 35 666 | 12/1997 |
| DE | 19601 731 | 2/1998 |
| DE | 197 14 221 | 10/1998 |
| DE | 197 42 802 C1 | 10/1998 |
| JP | 2000-221408 | 8/2000 |

OTHER PUBLICATIONS

Carl Zeiss Jena GmbH, "Universalmikroskop Axioplan 2", Oct. 1995, pp. 1-6, Zeiss Gruppe, Germany, XP-002235323.
Leica, "Systemmikrospkop für Materialuntersuchungen", Leica DM LM , Mar. 1998, pp. 1-8, Leica Microsystems Wetzler GmbH, Germany, XP-002235324.
Olympus, "Ergonomic Laboratory Microscope BX45/45A" BX2 Series, May 2000, pp. 1-8, XP-002235325.

* cited by examiner

*Primary Examiner*—Mark A. Robinson
(74) *Attorney, Agent, or Firm*—Crowell & Moring LLP

(57) ABSTRACT

The invention relates to a microscope, whose support consists of a principal transverse section, a foot section and a column section, which are essentially the same width. A supporting element, is provided on both sides of the column section, said element having the same width along its first contact surface as the column section.

12 Claims, 4 Drawing Sheets

MICROSCOPE

BACKGROUND AND SUMMARY OF THE INVENTION

The invention relates to a microscope. In particular, the invention relates to a microscope with a stand which is constructed of a base element which consists of a transverse section, a stand column section and a stand foot section. The stand column section has a first mounting surface for a microscope stage retaining element and an opposite second mounting surface for at least one light source.

There is an endeavor to configure the microscope or its stands such that sufficient free space is available in the region of the microscope stage retaining element and the lens turret to allow for various manipulations on a sample to be examined or several supplementary devices.

German patent specification DE 197 14 221 discloses an inspection microscope for the semiconductor industry. The microscope stand consists of a stand foot, a stand column and a transverse section. In order to enable unimpeded sample feeding from the rear of the microscope stand, the stand column is mounted laterally alongside the back end of the stand foot as well as of the transverse section arranged over it. This arrangement indeed permits a good accessibility, but does not reduce the base required in the region of the microscope stage retaining element.

A microscope is disclosed in DE 42 31 468 which includes a microscope stand foot which serves to accommodate a lighting device with optical components as well as with an aperture diaphragm or a radiant field screen. It is likewise obvious that such a configuration does not contribute to a reduction in the base.

Likewise, microscope stands for microscopes of conventional design are represented in DE 40 10 834. A basic insensitivity to vibration is obtained though a microscope stand consisting of a stand foot, a stand column, a tube support and bracing elements, in that bracing for the stand column is provided on the base level. The microscope stand possesses a rectangular base owing to which no reduction can be attained in essential areas.

DE 196 01 731 discloses a microscope with a "C"-shaped stand for the examination of disk-like objects with large dimensions. The stand consists of a baseplate, which allows no reduction of the base in the region of the microscope stage.

A compact light microscope is disclosed in DE 196 35 666, which is suited for all usual examination methods. It is constructed as a largely enclosed housing, which includes one or more electronic image sensors, at least one computer and a flat screen in addition to the optical and mechanical components. The integral digital light microscope can contain a microphone, loudspeaker and a video camera directed toward the user for control and electronic communication. Images and data associated with them are stored in the integrated digital mass storage units and can be digitally processed in the computer. The microscope represented here has a bulky design and offers no possibility for reducing the base in the region of the microscope stage retaining element or the microscope turret.

The invention is based on the task of creating a microscope, which can be ergonomically operated by a user, offers the user sufficient free space in the region of the adjustment elements of the microscope and thereby guarantees stability.

The objective is accomplished by a microscope with a stand, which is constructed of a base element having transverse section, a stand column section and a stand foot section, where the stand column section has a first mounting area for a microscope stage retaining element and an opposing second mounting surface for at least one light source. The transverse section, the stand foot section and the stand column section basically have the same width, wherein the stand is allocated a support element on both sides in the region of the stand column section, wherein the support element has a width of the stand column section along the first mounting surface and continuously and constantly widens proceeding from the transverse section and the first mounting surface in the direction of the second mounting area and the stand foot section.

The invention has the advantage that the transverse section, the stand foot section and the stand column section basically have the same width, and that the stand is allocated a support element bilaterally in the region of the stand column section. In this way, sufficient stability and steadiness of the microscope is achieved. In order to make sufficient free space available for a user, the support elements have a width corresponding to that of the stand column section along the first mounting area. Furthermore, the support element continuously and constantly widens proceeding from the transverse section and the first mounting area in the direction toward the second mounting surface and the stand foot section.

Each of the support elements consists of a first wall element with a first curved surface and a second wall element with a second curved surface, whereby each wall element rests with one side on the stand column section. The first curved surface and the second curved surface are configured as convexly curved surfaces in a preferred embodiment of the invention.

The support elements are configured such that a pinion head, for example for adjusting the height of a microscope table, is partially provided in a free recess formed on the support element. This has the advantage that the user has sufficient free space in the front region of the microscope and is not impaired by the adjustment elements for the microscope. Almost all actuation elements are for the most part installed in the region of the support elements. Thus, for example, several actuation elements are arranged on the support element in the region around the pinion head.

Further advantageous refinements of the invention can be inferred from the dependent claims.

BRIEF DESCRIPTION OF THE DRAWINGS

The object of the invention is represented schematically in the drawings and is described below on the basis of the figures, wherein.

DETAILED DESCRIPTION OF THE DRAWINGS

Figure 1:
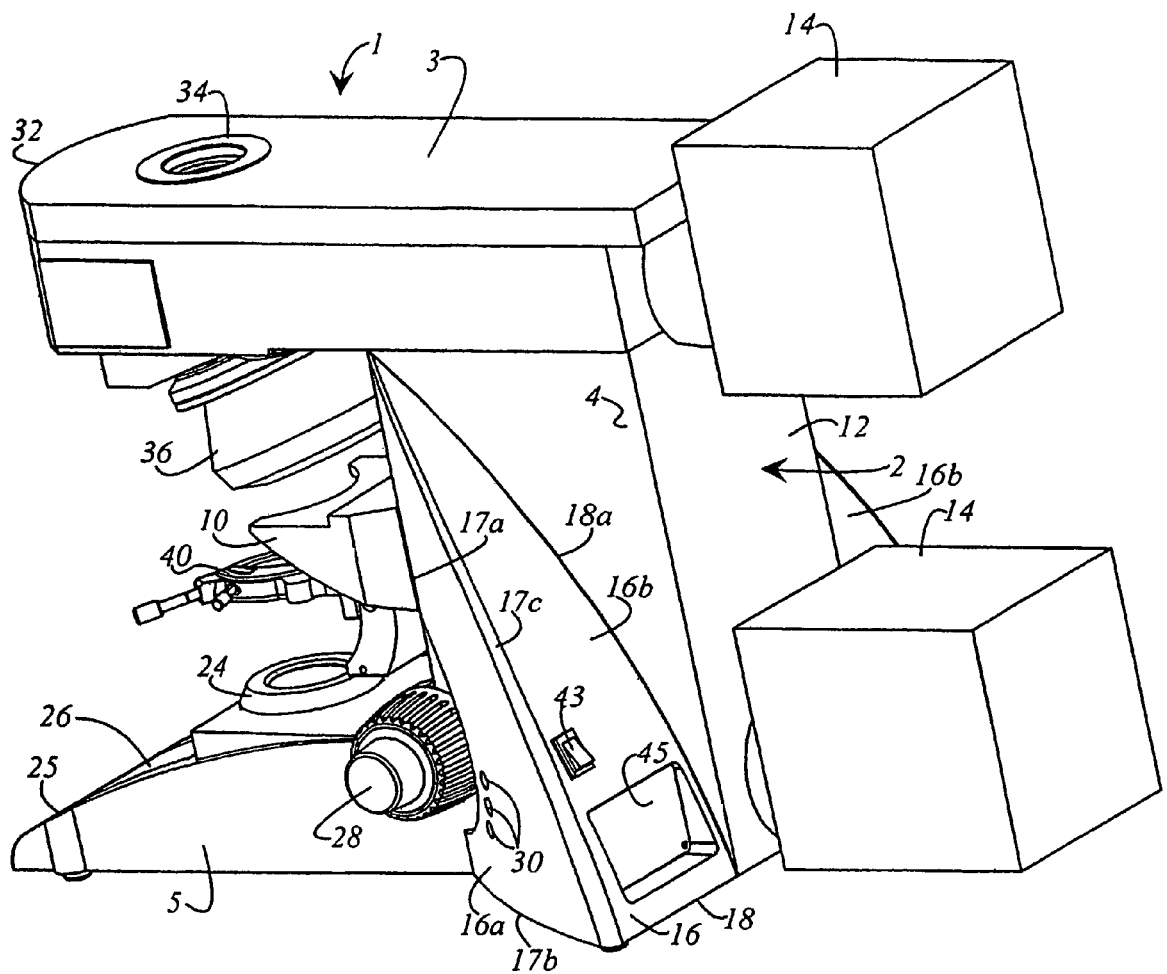
FIG. 1 Illustrates a perspective view of the microscope of the invention.

A perspective view of the microscope 1 of the invention is represented in FIG. 1. The microscope 1 includes a stand, which consists of a base element 2. The base element 2 is subdivided into three main sections, which are composed of a transverse section 3, a stand column section 4 and a stand foot section 5. A microscope stage retaining element 10 is fastened on the stand column section 4, with a filter holder 40 also possibly being provided in addition on said element 10. At least one light source 14 is provided on the stand column section 4 opposite the microscope stage retaining element 10. Two light sources 14 are provided in the embodiment depicted here. Here, one of the light sources 14 is for transillumination and the other light source is for vertical illumination. The stand column section 4 defines a first mounting area 8 (see FIG. 2) on which the microscope stage retaining element 10 is installed and a second mounting area 12 on which the at least one light source 14 is provided. The transverse section 3, the stand foot section 5 and the stand column section 4 are configured such that they basically have the same width (on this, see FIGS. 3 and 4).

A support element 16 is formed respectively on both sides on the stand in the region of the stand column section 4. Each of the two support elements 16 is formed such that it has the width of the stand column section 4 along the first mounting surface 8 and is continuously and constantly widened proceeding from the transverse section 3 and the first mounting surface 8 in the direction of the second mounting surface 12 and the stand foot section 5. In this embodiment, the support element 16 possesses a first wall element, which has a convexly curved surface 16a and a second wall element, which likewise has a second convexly curved surface 16b. Each of the second surfaces 16b possesses a basically straight lined side 18 in the region of the second mounting surface 12. How in the end the first and second surfaces 16a and 16b are curved is not of great importance for the technical aspect of the invention. It is of particular significance that each of the support elements 16 projects beyond the width of the stand foot section 5 in that region.

The first convexly curved surface 16a is established by a lateral line 17a and two lateral edges 17b and 17c. The lateral line 17a is basically constructed as a straight line and extends along the first mounting surface 8 of the stand column section 4. The first lateral edge 17b is curved and extends from the stand foot section to the end of the straight lined side 18, which faces away from the stand column section 4. The second lateral edge 17c likewise extends from the region in which the stand column section 4 and the transverse section 3 meet, in the direction of the end of the straight-lined side 18. The second surface 16b is formed by the second lateral edge 17c, the straight-lined side 18 and by a curved lateral line 18a. The curved lateral line 18a extends from the region in which the stand column section 4 and the transverse section 3 meet, in the direction of the end of the straight-line side, which straight line side 18 begins directly on the stand column section 4. A power switch 43 is provided on the second surface 16b in the embodiment in FIG. 1. Furthermore, a connection element 45 is likewise incorporated on the second surface 16b through which a power cable and/or a data cable can be connected to the microscope 1.

The stand foot section 5 is convexly curved in relation to the stand column section 4 and possesses a display 26 in the convexly curved region 25. The display 26 can likewise be constructed as a touch screen, which allows the user to make parameter inputs on this or to call up certain measuring methods. If the display 26 is not constructed as a touch screen, then current adjustment data of the microscope 1 are represented visually through the display 26. In addition, one pinion head 28 is respectively provided bilaterally in the transition region between the stand foot portion 5 and the support element 16 which, for example, adjusts the height of microscope stage retaining element 10. Placing still other functions on the pinion head 28 is also possible. Several actuation elements 30 are provided in the region around the pinion head 28 through which microscope functions can be switched. The microscope functions are, for example, filter change, diaphragm selection, turret motion, etc. An ocular flange 34 is constructed on the face element 32 of the transverse section 3, which produces an optical connection with a turret 36 upon which at least one lens (not represented) can be mounted.

Figure 2:
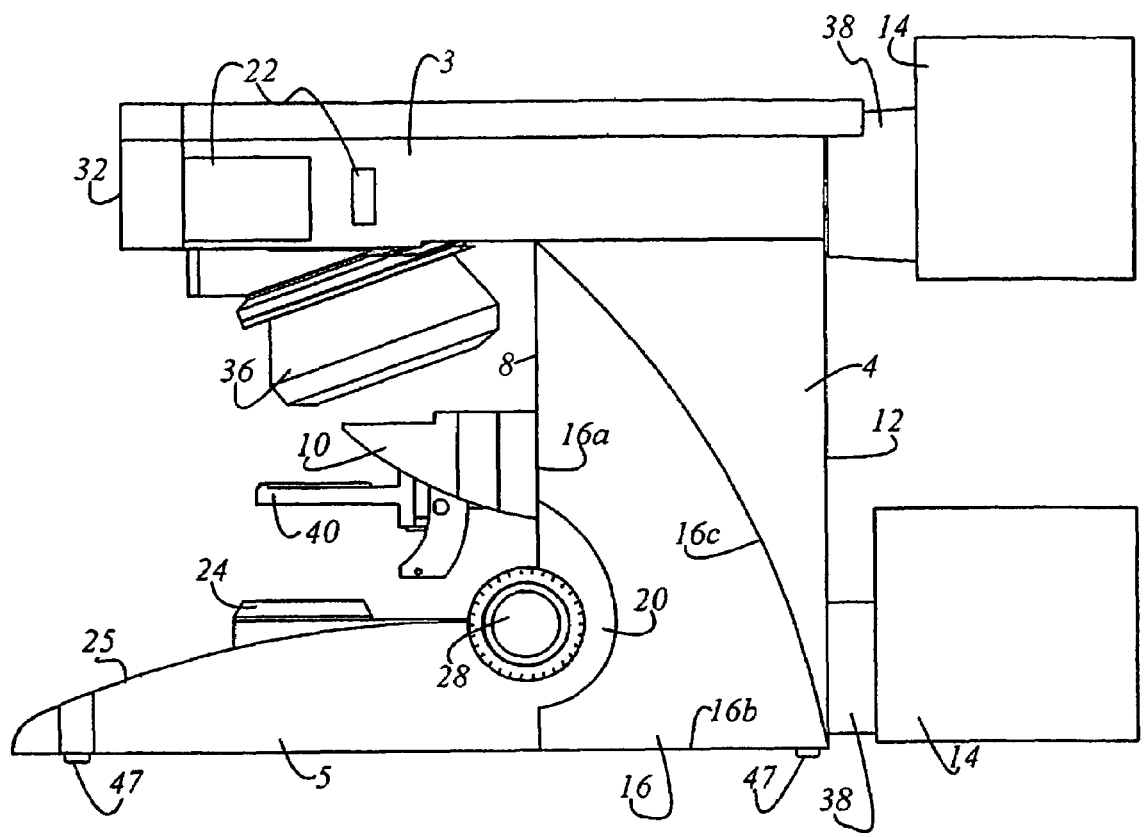
FIG. 2 Illustrates a side view of the microscope.

FIG. 2 shows the side view of the microscope 1 whereby in the description below only elements are mentioned which were not already mentioned in the description for FIG. 1 in order to avoid repetitions. The microscope 1 itself stands on several feet 47, which are constructed of a vibration damping material. A condenser 24 is provided in the stand foot section 5. Several elements 22 are provided in the crosspiece portion 3 of the microscope 1 through which various optical components (not represented) can be transferred into the optical path of the microscope. Each of the lamps 14 is connected with the second mounting surface 12 through a flange 38. The support element 16 contains a free recess 20 in the region around the pinion head 28 so as to make sufficient actuation space for the pinion head 28 available to the user.

Figure 3:
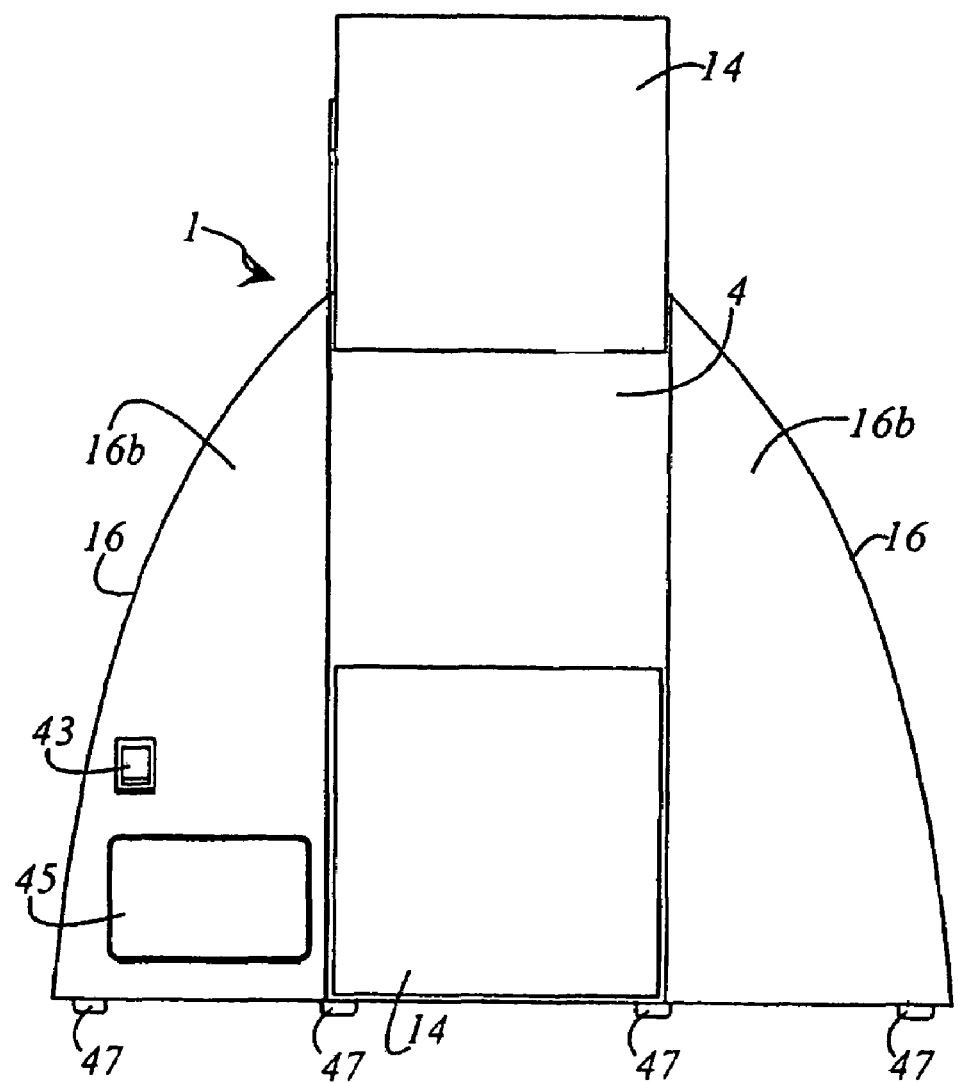
FIG. 3 Illustrates a back view of a microscope.

FIG. 3 shows the back view of the microscope 1. As already mentioned in the description for FIG. 1, the light sources 14 are mounted on the stand column section 4 and basically have the same width as the stand column section 4. The support elements 16 are represented on the drawing plane in the back view of the microscope 1, and it offers a view of the second curved surface 16b of the support element. Feet 47 are provided on the stand foot section 5 as well as on the support element 16. The power switch 43 and the connection element 45 are provided in one of the second curved surfaces 16b. It is obvious that other arrangements also lie within the scope of the skilled artisan.

Figure 4:
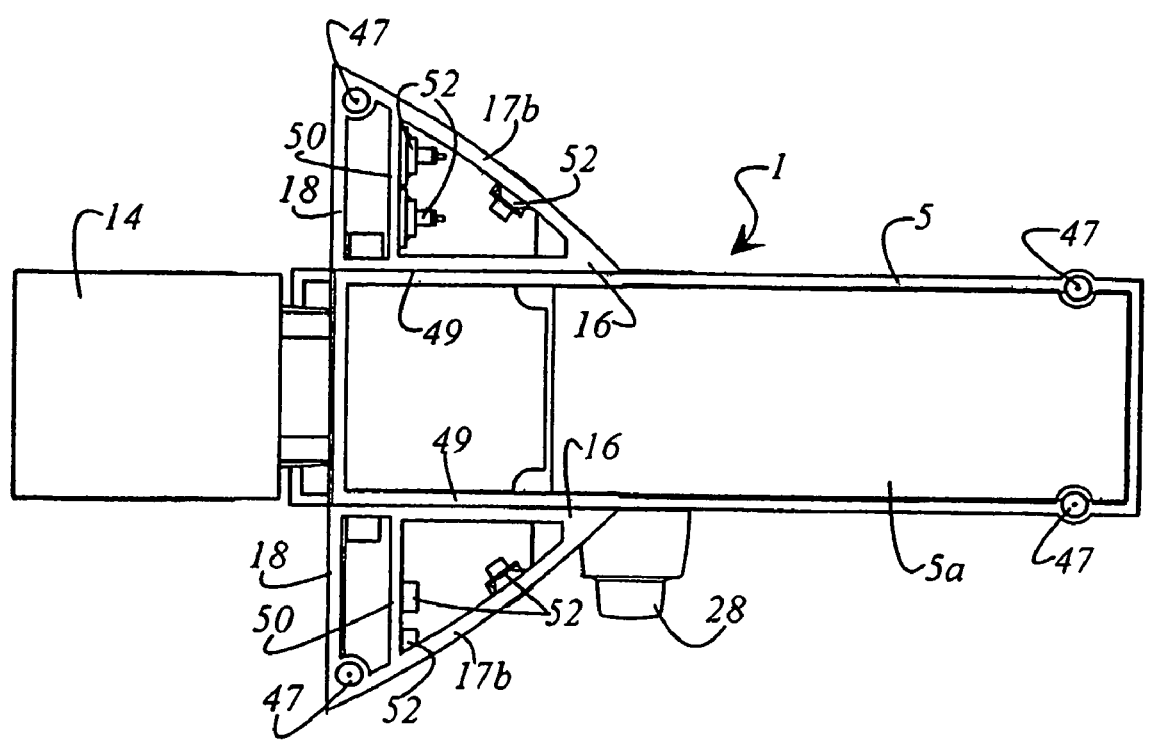
FIG. 4 Illustrates a view of the bottom of the microscope in accordance with the present invention.

FIG. 4 depicts a bottom view of the microscope 1. In the embodiment represented here, two feet 47 are constructed in the stand foot section 5. The stand foot section 5 is covered with at least one detachable bottom plate 5a on the bottom. This provides service personnel or the user with an access possibility to electrical, mechanical or optical elements in the interior of the stand foot section 5. The support elements 16 are installed on the stand foot section 5. The support elements 16 comprise a base in the projection onto the drawing plane in FIG. 4, wherein the base essentially corresponds to that of a right triangle, whereby the hypotenuse represents the curved side edge 17b of the first curved surface 16a. The shorter side resting on the right angle is formed by the straight line side 18. The longer side resting on the right angle is formed by a straight line side 49 resting on the stand foot section 5. All sides 17b, 18 and 49 forming the support element 16 are of a certain wall thickness so that the support element 16 is hollow on the inside. A brace 50 connects the curved side edge 17b and the straight lined side 49 resting against the stand foot section 5. Numerous contact elements 52 are provided in the interior of the support elements 16 through which electronic leads for control of the various microscope functions can be connected. It is clear from FIG. 4 that the pinion head 28 is arranged such there is at least a partial overlap with the support element 16. A further foot is respectively provided on the support element 16 in the region in which the straight line side 18 and the curved side edge 17b meet. It is obvious that the support elements 16 can likewise be closed with a bottom plate (not represented here).

The invention was described in reference to a specific embodiment. It is nonetheless obvious that changes and modifications can be made without departing from the spirit and scope of protection of the claims below.

REFERENCE NUMBER LIST

1 Microscope
2 Base element
3 Transverse section
4 Stand column section
5 Stand foot section
5a Bottom plate
8 First mounting area
10 Microscope stage retaining element
12 Second mounting area
14 Light source
15a First wall element
15b Second wall element
16 Support element
16a First curved surface
16b Second curved surface
17a Lateral line
17b Lateral edge
17c Lateral edge
18 Straight line side
18a Lateral line
20 Free recess
22 Elements
24 Condenser
25 Curved region
26 Display
28 Pinion head
30 Actuation elements
32 Face element
34 Ocular flange
36 Turret
38 Flange
40 Filter holder
43 Mains switch
45 Connection element
47 Feet
49 Side
50 Brace
52 Contact elements

The invention claimed is:

1. Microscope with a stand, which is constructed of a base element, having a transverse section, a stand column section and a stand foot section, where the stand column section has a first mounting area for a microscope stage retaining element and an opposing second mounting surface for at least one light source, wherein the transverse section, the stand foot section and the stand column section basically have the same width, wherein the stand is allocated a support element on both sides in the region of the stand column section, wherein the support element has a width of the stand column section along the first mounting surface and continuously and constantly widens proceeding from the transverse section and the first mounting surface in the direction of the second mounting area and the stand foot section.

2. Microscope according to claim 1, wherein each support element is constructed of a first wall element with a first curved surface and a second wall element with a second curved surface, and wherein each wall element rests with one side on the stand column section.

3. Microscope according to claim 2, wherein the first curved surface and the second curved surface are configured as convexly curved surfaces.

4. Microscope according to claim 3, wherein a pinion head is provided partially in a free recess constructed on one of the support elements to make sufficient actuation space available.

5. Microscope according to claim 2, wherein a pinion head is provided partially in a free recess constructed on one of the support elements to make sufficient actuation space available.

6. Microscope according to claim 2, wherein at least one power switch and/or a connection element is provided at least in the second wall element.

7. Microscope according to claim 1, wherein a pinion head is provided partially in a free recess constructed on one of the support elements to make sufficient actuation space available.

8. Microscope according to claim 7, wherein several actuation elements are arranged on one of the support elements in the region around the pinion head.

9. Microscope according to claim 1, wherein a convexly curved region is incorporated in the stand foot section in which a display is accommodated.

10. Microscope according to claim 9, wherein the display is constructed as a touch screen through which a user performs parameter inputs.

11. Microscope according to claim 1, wherein several vibration-damping feet are provided.

12. Microscope according to claim 11, wherein at least two feet are incorporated on the stand foot section and at least one foot, respectively, on the support element, whereby the at least one foot on the support element is provided in a region in which a straight line side and a curved side edge meet.

* * * * *